United States Patent
Haddjeri (10) Patent No.: US 8,562,299 B2
(45) Date of Patent: Oct. 22, 2013

(54) BLADE FOR A DEVICE FOR GENERATING ENERGY FROM A FLUID FLOW

(75) Inventor: Nordine Haddjeri, Marseilles (FR)

(73) Assignee: NHEOLIS (SARL), Marseilles (FR)

( * ) Notice: Subject to any disclaimer, the term of this patent is extended or adjusted under 35 U.S.C. 154(b) by 496 days.

(21) Appl. No.: 12/937,113

(22) PCT Filed: Apr. 21, 2009

(86) PCT No.: PCT/FR2009/000469
§ 371 (c)(1),
(2), (4) Date: Dec. 7, 2010

(87) PCT Pub. No.: WO2009/133318
PCT Pub. Date: Nov. 5, 2009

(65) Prior Publication Data
US 2011/0070094 A1 Mar. 24, 2011

(30) Foreign Application Priority Data
Apr. 22, 2008 (FR) ...................................... 08 02250

(51) Int. Cl.
*F03D 1/06* (2006.01)
(52) U.S. Cl.
USPC ..................................................... 416/197 A (58) Field of Classification Search
USPC .......... 416/197 R, 197 A, 197 B, 197 C, 243, 416/176; 415/4.3, 4.5, 908, 72, 75
See application file for complete search history.

(56) References Cited

U.S. PATENT DOCUMENTS 4,086,026 A 4/1978 Tamanini

FOREIGN PATENT DOCUMENTS

| FR | 2869068 A | 10/2005 |
|---|---|---|
| FR | 2872867 A | 1/2006 |
| FR | 2872867 A1 * | 1/2006 |
| WO | 2005015009 A | 2/2005 |

* cited by examiner

*Primary Examiner* — Richard Edgar
(74) *Attorney, Agent, or Firm* — Egbert Law Offices, PLLC (57) ABSTRACT

A blade for a device for generating energy from a fluid including a driving surface inside which a fluid is intended to flow in order to rotate the blade about a rotational axis $\vec{X}_0$, $\vec{Y}_0$ which defines with axes $\vec{Y}_0$, $\vec{Z}_0$ an orthogonal reference frame, $\vec{X}_0$, $\vec{Y}_0$, $\vec{Z}_0$. Said blade being bounded by a leading edge and a trailing edge, narrowing between the leading edge and the trailing edge, running along a neutral fiber, where the projection of the neutral fiber onto the plane $\vec{X}_0$, $\vec{Y}_0$ has a first curvature. The plane $\vec{X}_0$, $\vec{Y}_0$ being defined so as to contain the neutral fiber at the leading edge. The blade is particularly applicable to wind generators.

15 Claims, 8 Drawing Sheets

BLADE FOR A DEVICE FOR GENERATING ENERGY FROM A FLUID FLOW

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a blade for generating energy from the flow of fluid, which can be air or water.

2. Description of Related Art Including Information Disclosed Under 37 CFR 1.97 and 37 CFR 1.98

Over the past few years, environmental concerns and the growing cost of fossil-fuel sources have led to renewed interest in alternative forms of energy, especially in the field of wind turbines.

The latest wind turbine solutions consist of wind turbines with a rotor on a horizontal axis extending perpendicularly to the direction of the wind and mounted on a mast.

This technology is often used for large-scale installations.

Solutions of smaller size have also been proposed, particularly for installations near buildings that consume electrical energy. Document FR A 2872867 falls within this category and discloses a device that generates energy from wind, consisting of a windpower generator having a rotor whose blades are semi-conical in shape and nearly parallel to their axis of rotation. Essentially used with a horizontal axis of rotation, this type of energy-generating device is sufficiently compact to be compatible with multiple installation locations, primarily on building roofs.

Although the efficiency of windpower generators is generally satisfactory, any improvement of their output would be greatly welcome.

The invention seeks to improve the output of this type of energy-generating device.

BRIEF SUMMARY OF THE INVENTION

To that end, the invention provides for a blade for generating energy from a fluid, comprising a drive surface within which a fluid is intended to flow in order to drive the rotating blade around an axis of rotation $\vec{X}_0$ that defines, with axes $\vec{Y}_0$, $\vec{Z}_0$, an orthogonal frame of reference $\vec{X}_0$, $\vec{Y}_0$, $\vec{Z}_0$. The blade is delimited by a leading edge and a trailing edge, and narrows between the leading edge and trailing edge. It extends along a neutral axis whose projection onto the $\vec{X}_0$, $\vec{Y}_0$ plane has a first curvature, the $\vec{X}_0$, $\vec{Y}_0$ plane being defined so as to contain the neutral axis near the leading edge.

Thus, the invention provides for a very specific blade shape, allowing it to capture a substantial portion of the energy of the fluid. The invention thereby helps to significantly improve the output of devices for generating energy from fluid flow.

Optionally, the invention may have at least one of any of the following characteristics:

the first curve is arranged so that in the $\vec{X}_0$, $\vec{Y}_0$ plane, the neutral axis moves away from the axis of rotation, $\vec{X}_0$, from the leading edge to the trailing edge. In another embodiment, the first curve is arranged so that in the $\vec{X}_0$, $\vec{Y}_0$ plane, the neutral axis moves toward the axis of rotation, $\vec{X}_0$, from the leading edge to the trailing edge.

preferentially, the blade has a first portion that extends from the leading edge to the trailing edge and is appreciably parallel to the axis of rotation, $\vec{X}_0$. It has a second portion that extends from the first portion to the trailing edge and which is curved. This curve tends to move away from or, according to an alternate and especially advantageous embodiment, move toward the trailing edge of axis $\vec{X}_0$. The direction of this curve is appreciably perpendicular to the $\vec{X}_0$, $\vec{Y}_0$ plane.

the projection of the neutral axis onto the $\vec{Z}_0$, $\vec{X}_0$ plane presents a second curve.

the neutral axis is contained in plane P, inclined at an angle d with respect to the $\vec{X}_0$, $\vec{Y}_0$ plane.

angle d is comprised between 50° and 100° and preferably between 60° and 90° advantageously, angle d is comprised between 55° and 65° plane P is appreciably parallel to the $\vec{X}_0$ axis in plane P, the neutral axis presents a uniform principal curve said principal curve has a radius of curvature $R_p$ comprised between L/2 and 10 L, and preferably between 0.7 L and L, L being the length of the neutral axis the intersection of planes P and $\vec{X}_0$, $\vec{Y}_0$ at the leading edge defines a point A belonging to the neutral axis the neutral axis comprises a point A at the leading edge, a point B included in the $\vec{X}_0$, $\vec{Y}_0$ plane, and a point C on the trailing edge, so that portions AB and BC of the neutral axis, respectively delimited by points A and B and by points B and C, are situated on either side of the $\vec{X}_0$, $\vec{Y}_0$ plane the curve of the neutral axis defines a cavity comprised between 0% and 20% and preferably between 10% and 15% the tangent to the neutral axis at point A makes an angle, α, of approximately 13° with the $\vec{X}_0$, $\vec{Y}_0$ plane the length of the AB portion is approximately equal to a third of the length of the AC portion the drive surface twists around the neutral axis the twist is continuous along at least a portion of the blade the drive surface twists around the neutral axis along the portion BC and does not twist along the AB portion the twist of the BC portion is comprised between 40° and 80° and, preferably, on the order of 60° the twist of the BC portion is continuous the AB portion appreciably has no twist the drive surface comprises an opening that extends appreciably parallel to the neutral axis at every point $p_i$ of the neutral axis, the section of the drive surface included in a plane, $\vec{y}_i$, $\vec{z}_i$, perpendicular to plane P is symmetrical to a plane, $\vec{z}_i$, $\vec{x}_i$, planes $\vec{y}_i$, $\vec{z}_i$ and $\vec{z}_i$, $\vec{x}_i$ being defined by an orthogonal frame of reference, $\vec{x}_i$, $\vec{y}_i$, $\vec{z}_i$, whose center coincides with the point, whose $\vec{x}_i$ axis coincides with the tangent to the neutral axis (10) at point $p_i$ and is oriented toward the trailing edge (5), and whose $\vec{y}_i$, $\vec{z}_i$ axes follow said twist the drive surface section appreciably has the shape of a portion of a circle the center of the circle portion is situated on the neutral axis for a diameter $D_{leading}$ of the section of the drive surface measured along the leading edge, the diameter $D_{trailing}$ of the section of the drive surface measured along the trailing edge is such that:

$$\frac{D_{leading}}{3.5} \leq D_{trailing} \leq \frac{D_{leading}}{2.5}$$

the length, L, of the neutral axis between the leading edge and the trailing edge is such that $D_{leading} \cdot 3.5 \leq L \leq D_{leading} \cdot 4.5$ at every point $p_i$ of the neutral axis, the $\vec{z}_i$, $\vec{x}_i$ plane is appreciably equidistant from the two edges delimiting the opening contained in the $\vec{y}_i$, $\vec{z}_i$ plane.

Furthermore, the invention provides for a rotor for a device for generating energy from a fluid, comprising at least one blade according to any of the previous characteristics.

The invention also provides for a device for generating energy from a fluid comprising a generator coupled to such a rotor.

The rotor is mounted on a vertical mast arranged so it orients itself toward the direction of the fluid. Preferably, this automatic orientation does not require the assistance of an outside or attached system other than the drag induced by the flow of the fluid.

BRIEF DESCRIPTION OF THE DRAWINGS

Other characteristics, objectives, and advantages of the present invention shall become apparent upon examination of the detailed description that follows together with the attached drawings, which are provided as non-limiting examples. In these drawings.

DETAILED DESCRIPTION OF THE INVENTION

Figure 1:
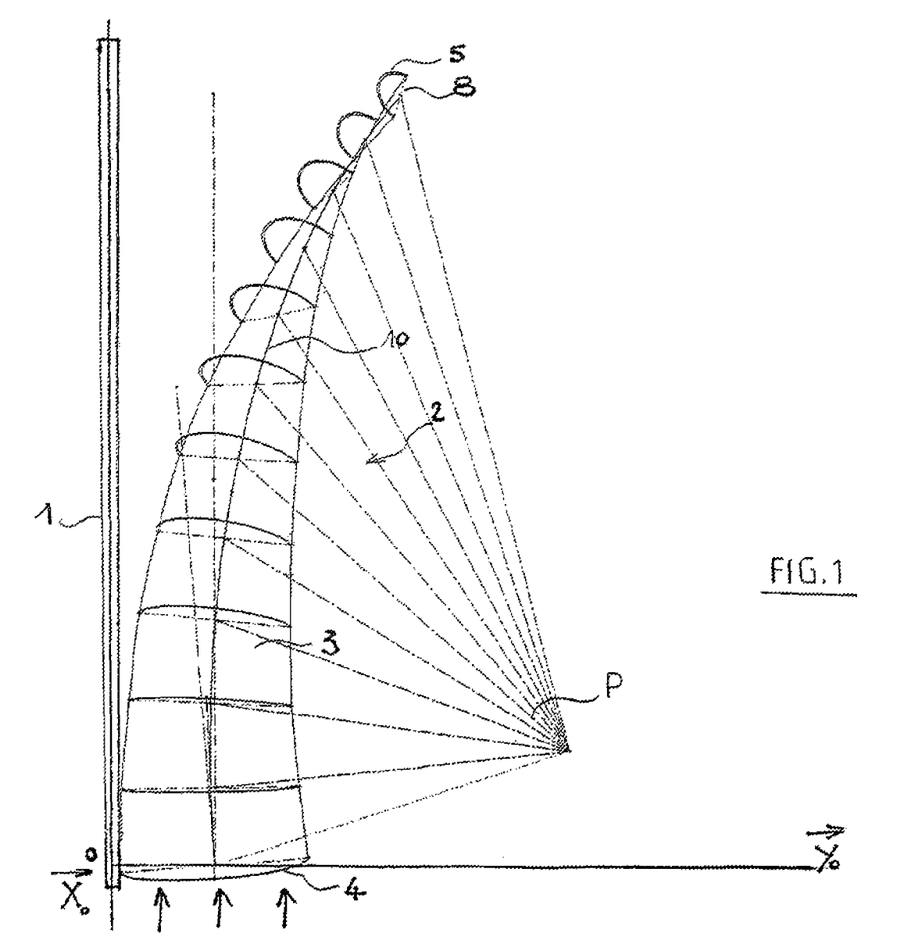
FIG. 1 is a two-dimensional view of a blade along the $\vec{X}_0$, $\vec{Y}_0$ plane according to an embodiment of the invention.
Figure 7:
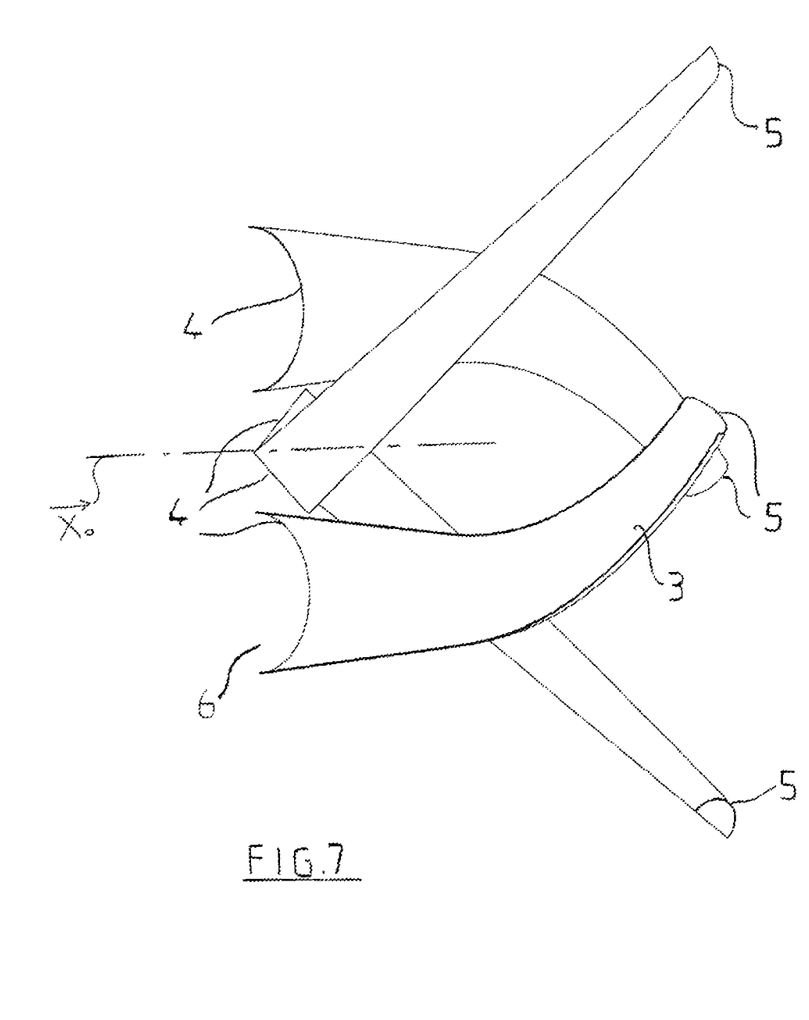
FIGS. 7 and 8 illustrate two views of an embodiment of a rotor equipped with blades according to a variant embodiment of the invention.
Figure 8:
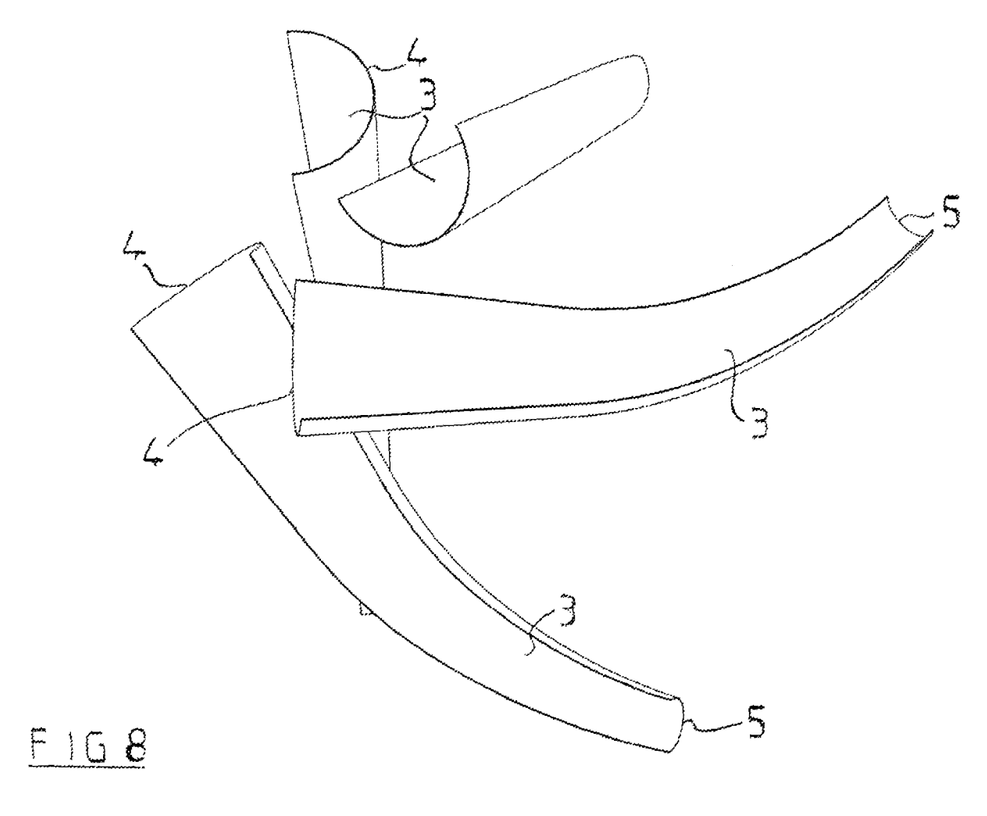

Referring to FIGS. 1 and 8, examples of the blade according to the invention will now be given. The figures show a blade 2 intended to turn from the effect of fluid flow around an axis of rotation $\vec{X}_0$. The axis of rotation, $\vec{X}_0$, is materialized by a shaft 1 with which blade 2 is intended to be rotationally associated whenever it is found in an energy-generating device. Blades 2, shown in FIGS. 1 to 8, are configured to rotate about the axis of rotation, $\vec{X}_0$, in the clockwise direction, as defined by the orthogonal frame of reference $\vec{X}_0$, $\vec{Y}_0$, $\vec{Z}_0$. The orientation and direction of fluid flow are shown by the arrows in FIGS. 1 to 3.

Blade 2 has a drive surface 3 delimited upstream by leading edge 4 and downstream by trailing edge 5. Drive surface 3 defines the interior volume along which the fluid is intended to flow in order to drive blade 2 rotationally during operation.

Drive surface 3 extends along a neutral axis 10. Neutral axis 10 extends primarily in a direction that is appreciably parallel to the axis of rotation, $\vec{X}_0$, and, therefore, in a direction appreciably parallel to the wind direction. Blade 2, the object of the present invention, thus differs from many blades designed to equip rotors, where they extend perpendicularly to the rotor axis.

At every point $p_i$ of neutral axis 10, we can define an orthogonal frame of reference, $\vec{x}_i$, $\vec{y}_i$, $\vec{z}_i$, whose center is coincident with point $p_i$ and whose $\vec{x}_i$ axis is coincident with the tangent to neutral axis 10 at point $p_i$ and is oriented toward trailing edge 5. Thus, at every point $p_i$, the $\vec{y}_i$, $\vec{z}_i$ plane defines a section of drive surface 3.

The dimensions of the sections of drive surface 3 decrease from leading edge 4 to trailing edge 5. This decrease may be continuous or discontinuous. In the examples shown in the figures, the change in dimension of the sections of the drive surface decreases continuously and linearly from leading edge 4 to trailing edge 5. The reduction in section promotes the acceleration of the fluid as it flows within the drive surface.

Neutral axis 10 is arranged in such a way that its projection on the $\vec{X}_0$, $\vec{Y}_0$ plane shows a first curvature.

At trailing edge 4 neutral axis 10 cuts the $\vec{X}_0$, $\vec{Y}_0$ plane along the $\vec{Y}_0$ axis.

This curvature allows improved capture of the energy of the fluid as it flows along drive surface 3, primarily by following the fluid, which has a tendency to escape toward zones that demonstrate less resistance.

Neutral axis 10 is suitably arranged so that its projection on the $\vec{Z}_0$, $\vec{X}_0$ plane presents a second curvature.

The kinetic energy of the fluid can thus be captured more efficiently, thereby leading to an appreciable improvement in output compared to known blades that extend primarily along a direction parallel to the axis of rotation.

The drive surface has an opening 6 appreciably parallel to neutral axis 10.

In the example shown, opening 6 extends from leading edge 4 to trailing edge 5. This opening 6 defines two edges that also extend appreciably parallel to neutral axis 10. Thus, every section of the drive surface found in a plane $\vec{y}_i$, $\vec{z}_i$ defines a profile having a first and second extremity corresponding, respectively, to one of said edges.

Drive surface 3 is shaped in such a way that neutral axis 10 is substantially coincident with the line formed by the ensemble of the centers of the segments connecting said first extremity to said second extremity.

In the embodiments shown, in each of said neutral-axis 10 sections, said profile is appreciably symmetrical to an axis of symmetry parallel to the $\vec{z}_i$ axis and passing through the center of the segment connecting said first to said second extremity.

Suitably, the profile defines a portion of a circle. More specifically, in the examples shown, the profile has the shape of a semicircle. Thus, drive surface 3 has a semi-conical shape with a curved axis.

Preferably, drive surface 3 twists around neutral axis 10. This twist is apparent on the blades of the embodiment in FIGS. 1 to 6. Drive surface 3 is shaped so that trailing edge 5 is angularly offset with respect to leading edge 4 in the clockwise direction when blade 2 is intended to turn clockwise. This twist is configured so that drive surface 3 follows the fluid streams in order to increase energy transfer between the fluid and drive surface 3.

The twist may be continuous or discontinuous. It may also extend over the entirety of neutral axis 10 or only over a portion of the latter. In the example shown, a first portion of blade 2, extending from leading edge 4 to the section containing point B, shows no twist with respect to the segment connecting the two extremities of leading section 4. Preferably, this latter segment is nearly coincident with the $\vec{Y}_0$ axis. A second portion of blade 2, extending from the first portion to trailing edge 5 is twisted. Advantageously, the first portion of blade 2 extends for approximately a third of the length of the blade.

The concave shape of the blade determines a cavity that may be comprised between 0% and 20% along the length of the blade and, preferably, between 10% and 15%.

This shape helps create a depression on the back side of the blade that promotes a first aerodynamic force that results in a drive torque on the rotor.

The continuous reduction of the section of the blade accelerates the fluid, while the curvature of the centerline tends to present the fluid with a greater angle of incidence, which is directed toward the exterior so as to capture the fluid that is guided in this direction and escapes toward those portions that show less resistance.

The particular arrangement of drive surface 3 imposes upon the flowing fluid an optimized restitution of its energy. Consequently, this allows for a very significant improvement in the output of the blades, extending primarily parallel to the axis of rotation.

In short, the blade configuration involves two types of aerodynamic force:

The first is the result of the compression of the inside and the depression of the outside, forces that are promoted by the curvature of the blade, resulting in a concavity (which can be adapted to the conditions of fluid velocity where the machine is installed). The fluid directed by the very shape of the blade has a variable angle of incidence. For each angle of incidence the blade will always present a concavity that generates an aerodynamic force that, in total, will be the result of all the forces of this type that each of the elementary concavities composing the blade will have generated.

The second force results from the Bernoulli phenomenon, whereby the fluid is accelerated when the cross-section of the channel in which it flows decreases. The reduction in cross-section, the curvature and twist thereby capture the energy arising from this phenomenon.

The final result is the combination of these effects.

The example of blade 2 shown in FIGS. 4 to 6 will now be described in greater detail.

Such a blade 2 makes use of the characteristics of the blade described above. It is arranged in such a way that its neutral axis 10 is contained in plane P.

The $\vec{Y}_0$ axis is such that the intersection of neutral axis 10 and the $\vec{X}_0$, $\vec{Y}_0$ plane defines a point, A, on neutral axis 10, located appreciably on leading edge 4.

This plane P is inclined at an angle d to the $\vec{X}_0$, $\vec{Y}_0$ plane.

Angle d is advantageously comprised between 50° and 90° and, preferably, between 55 and 65°. More advantageously it is appreciably equal to 60°.

The curvature of neutral axis 10 in plane P will be referred to below as the principal curvature. Preferably, the principal curvature is appreciably constant. This principal curvature has a radius of curvature, $R_P$, comprised between L/2 and 10 L, and preferably between 0.7 L and L.

Thus, for this example of blade 2, as for those illustrated in FIGS. 1 to 3 and 7 to 8, the projection of the neutral axis on the $\vec{X}_0$, $\vec{Y}_0$ plane presents a first curvature, and the projection of the neutral axis on the $\vec{Z}_0$, $\vec{X}_0$ plane presents a second curvature.

As shown by the embodiment represented in FIGS. 1 to 6, the principal curvature is shaped in such a way that neutral axis 10 diverges from axis of rotation $\vec{X}_0$ from leading edge 4 to trailing edge 5. According to another embodiment shown in FIGS. 7 and 8, the principal curvature is shaped in such a way that the neutral axis approaches axis of rotation $\vec{X}_0$ from the leading edge toward the trailing edge. This embodiment is especially advantageous in terms of output.

Advantageously, point A is located on the $\vec{Y}_0$ axis and plane P is appreciably parallel to the $\vec{X}_0$ axis.

In the example shown in FIGS. 1 to 6, between leading edge 4 and trailing edge 5, neutral axis 10 comprises a point, B, that is included in the $\vec{X}_0$, $\vec{Y}_0$ plane. Additionally, neutral axis 10 defines a point, C, on trailing edge 5. Neutral axis 10 thus has two portions respectively delimited by points A and B and by points B and C and respectively referred to as portion AB and portion BC.

Blade 2 is arranged so that portions AB and BC are situated on either side of plane $\vec{X}_0$, $\vec{Y}_0$. In the example shown, the coordinates of point A on the $\vec{Y}_0$ axis are positive. The coordinates of the points on the centerline forming portion AB on the $\vec{Z}_0$ axis are negative, and the coordinates of the centerline forming portion BC on the $\vec{Z}_0$ axis are positive.

The tangent to neutral axis 10 at point A makes an angle of approximately 13° with the $\vec{X}_0$, $\vec{Y}_0$ plane.

Advantageously, the length of portion AB is approximately equal to a third of the length of portion AC.

Drive surface 3 twists around neutral axis 10. This twist occurs in the clockwise direction from leading edge 4 toward trailing edge 5.

Advantageously, drive surface 3 twists around neutral axis 10 along portion BC and does not twist along portion AB.

Preferably, the twist is continuous along portion BC. It is comprised between 40° and 80° and, preferably, is on the order of 60°.

Thus, the blade can, among others, combine an aerodynamic force resulting from the compression and depression created along blade 2, and an acceleration of the fluid generated by the Bernoulli effect. Moreover, the effects caused by blade 2 are generated in three dimensions, contrary to known blades, which channel the fluid in a two-dimensional space.

The aerodynamic effects associated with portions AB and BC are appreciably similar to the effects associated respectively with the first and second portions of the blade described previously with reference to FIGS. 1 to 3.

As with blades 2 illustrated in FIGS. 1 to 3 and 7 to 8, drive surface 3 comprises opening 6 extending appreciably parallel to neutral axis 10, while the sections of drive surface 3 appreciably have the shape of a semicircle.

Drive surface 3 can be shaped as a single piece. FIG. 4 shows the geometric generation of the blade. It is used to make the mold from which the blade will be obtained.

It turns out that blade 2 according to the invention, whose dimensions observe the following ratios, has a particularly high output:

$$\frac{D_{leading}}{4} \leq D_{trailing} \leq \frac{D_{leading}}{2}$$

and $$D_{leading} \cdot 3 \leq L \leq D_{leading} \cdot 5$$

More particularly, $$\frac{D_{leading}}{3.5} \leq D_{trailing} \leq \frac{D_{leading}}{2.5}$$

and $$D_{leading} \cdot 3.5 \leq L \leq D_{leading} \cdot 4.5$$

More particularly, $$D_{trailing} = \frac{D_{leading}}{3}$$

and $$L = 4 \, D_{leading}$$

Where:

$D_{leading}$=characteristic dimension of the section of the drive surface at the leading edge. For a semicircular section, $D_{leading}$ corresponds to the diameter of said section at the leading edge.

$D_{trailing}$=characteristic dimension of the section of the drive surface at the trailing edge. For a semicircular section, $D_{trailing}$ corresponds to the diameter of said section at the trailing edge.

L=length of the chord of neutral axis 10 between the leading and trailing edges.

Figure 4:
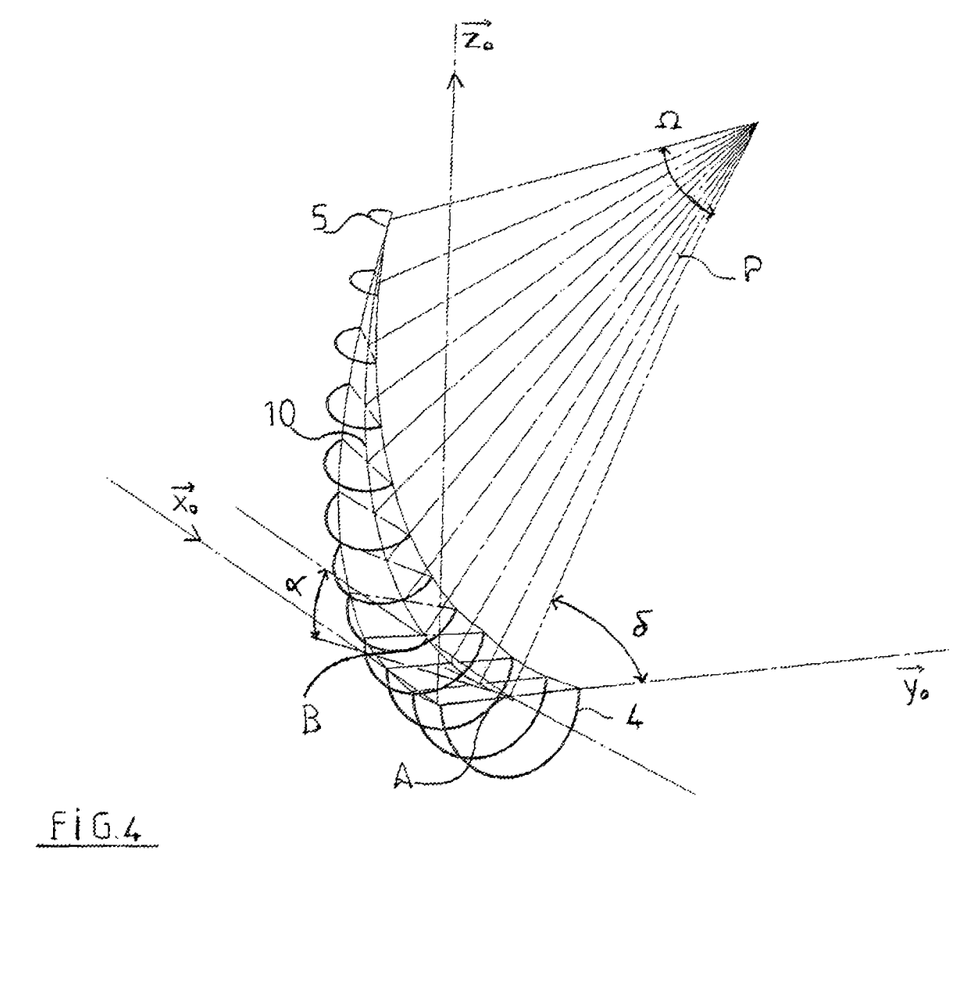
FIG. 4 is a three-dimensional view of the generation of a blade according to another embodiment of the invention.
Figure 5:
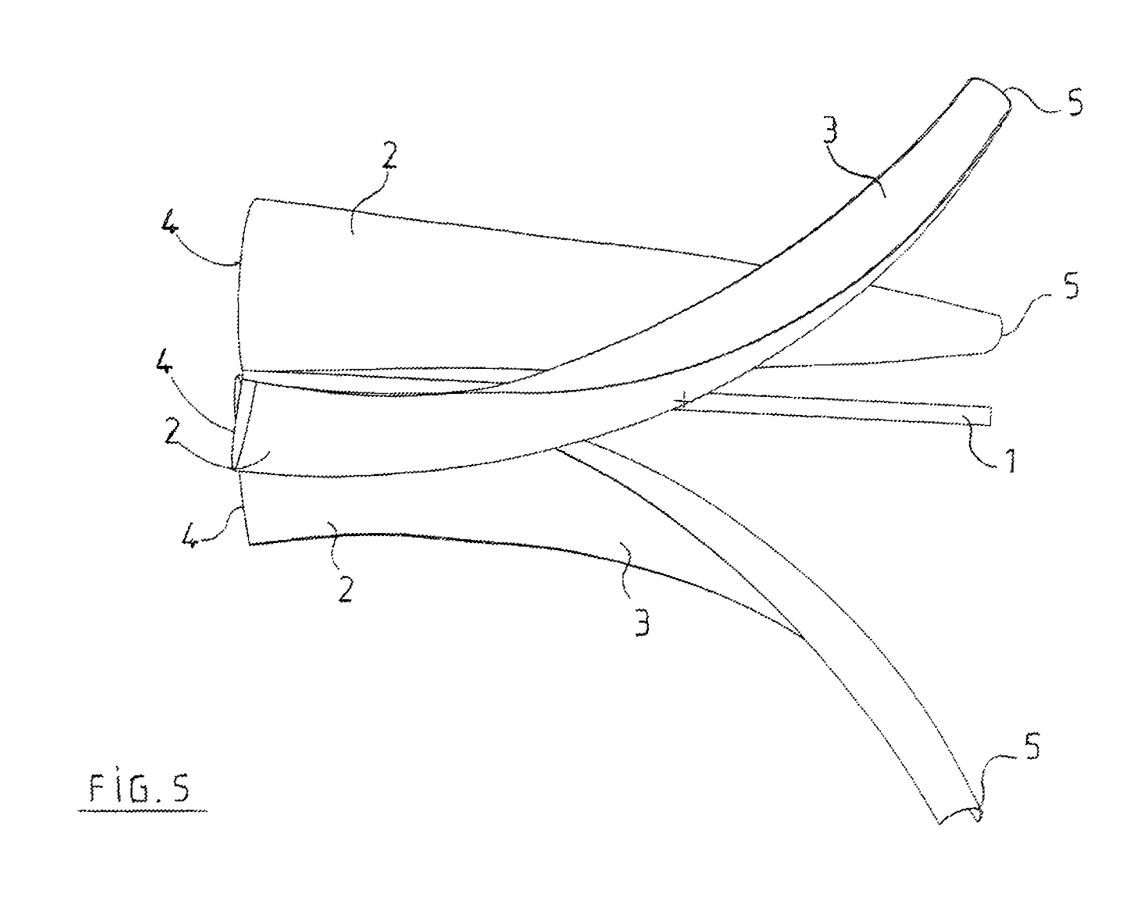
FIG. 5 is a longitudinal view of an example of a rotor equipped with three blades according to the example shown in FIG. 4.
Figure 6:
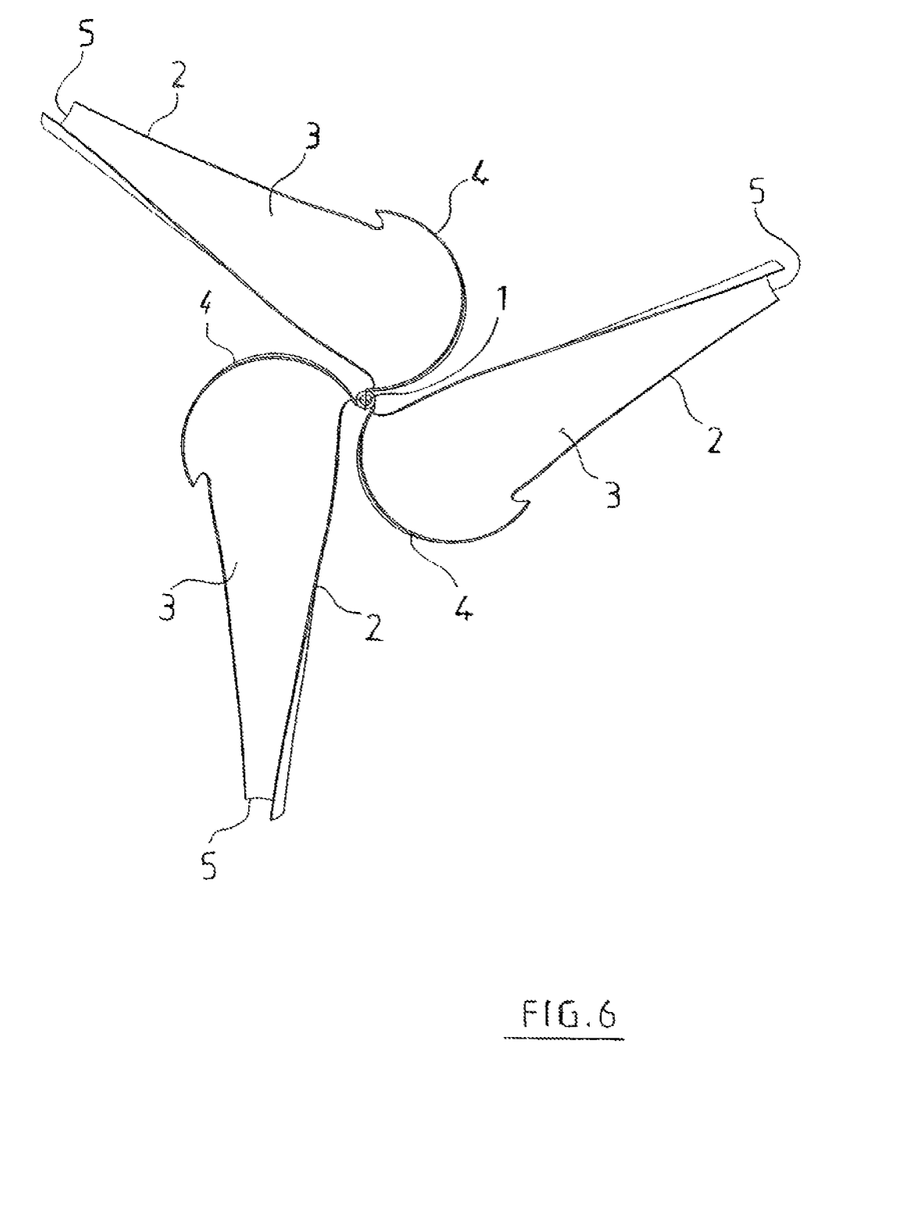
FIG. 6 is a view along the $\vec{X}_0$ axis of the rotor shown in FIG. 5.

As an example, blade 2 shown in FIGS. 4 to 6 has the following dimensions:

length of the neutral axis L=2 meters; $D_{leading}$=0.50 m; $D_{trailing}$=0.17 m; Rp, radius of principal curvature=1.60 m; angle d=60°; the angle intercepting the arc of the neutral axis, O=72°.

The length of the neutral axis is adapted to the desired energy production and this holds even for large amounts of energy on the megawatt order.

As indicated previously, another object of the invention is a rotor for a device for generating energy from fluid flow.

Figure 2:
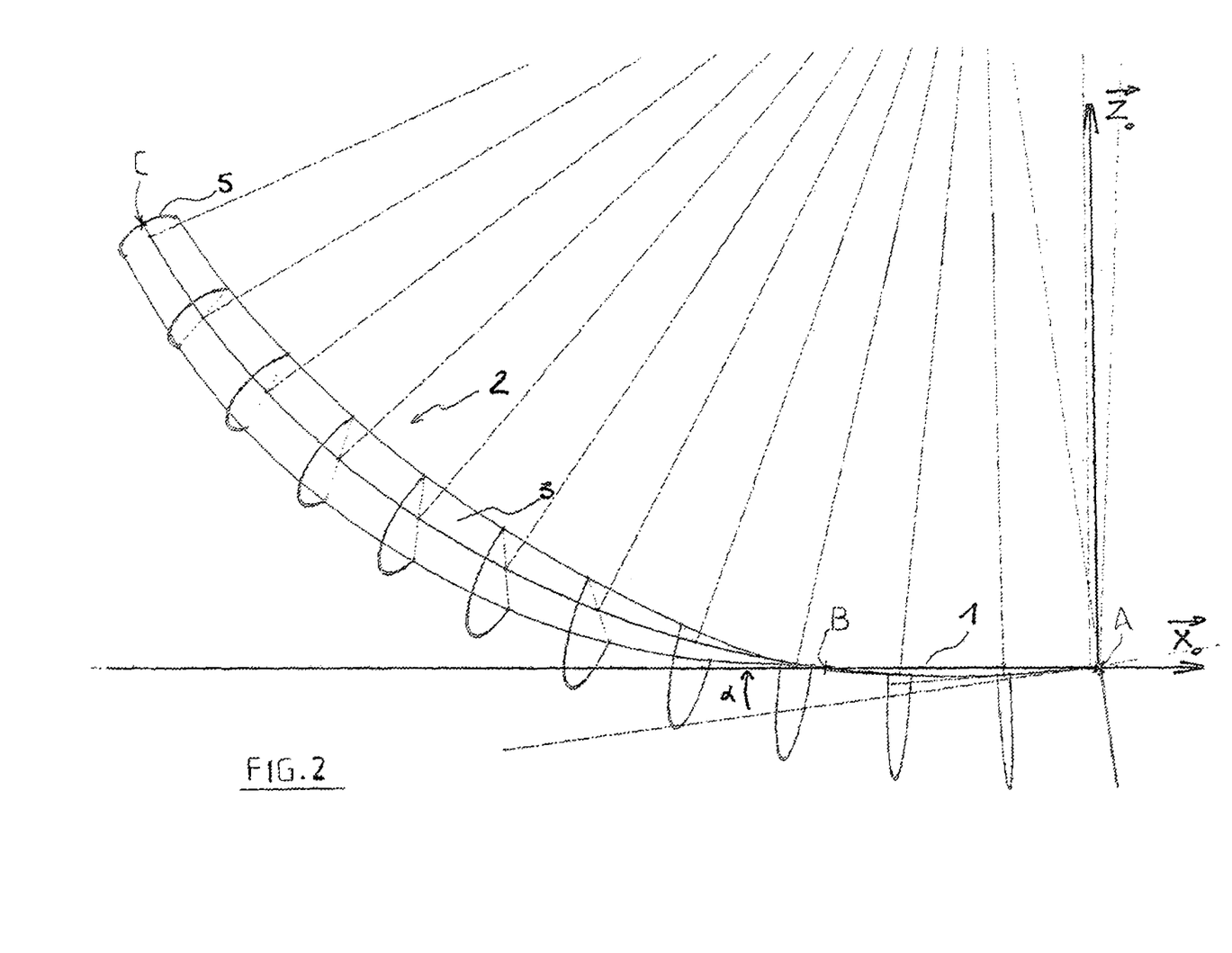
FIG. 2 is a two-dimensional view of the blade of FIG. 1 in the $\vec{Z}_0$, $\vec{X}_0$ plane.
Figure 3:
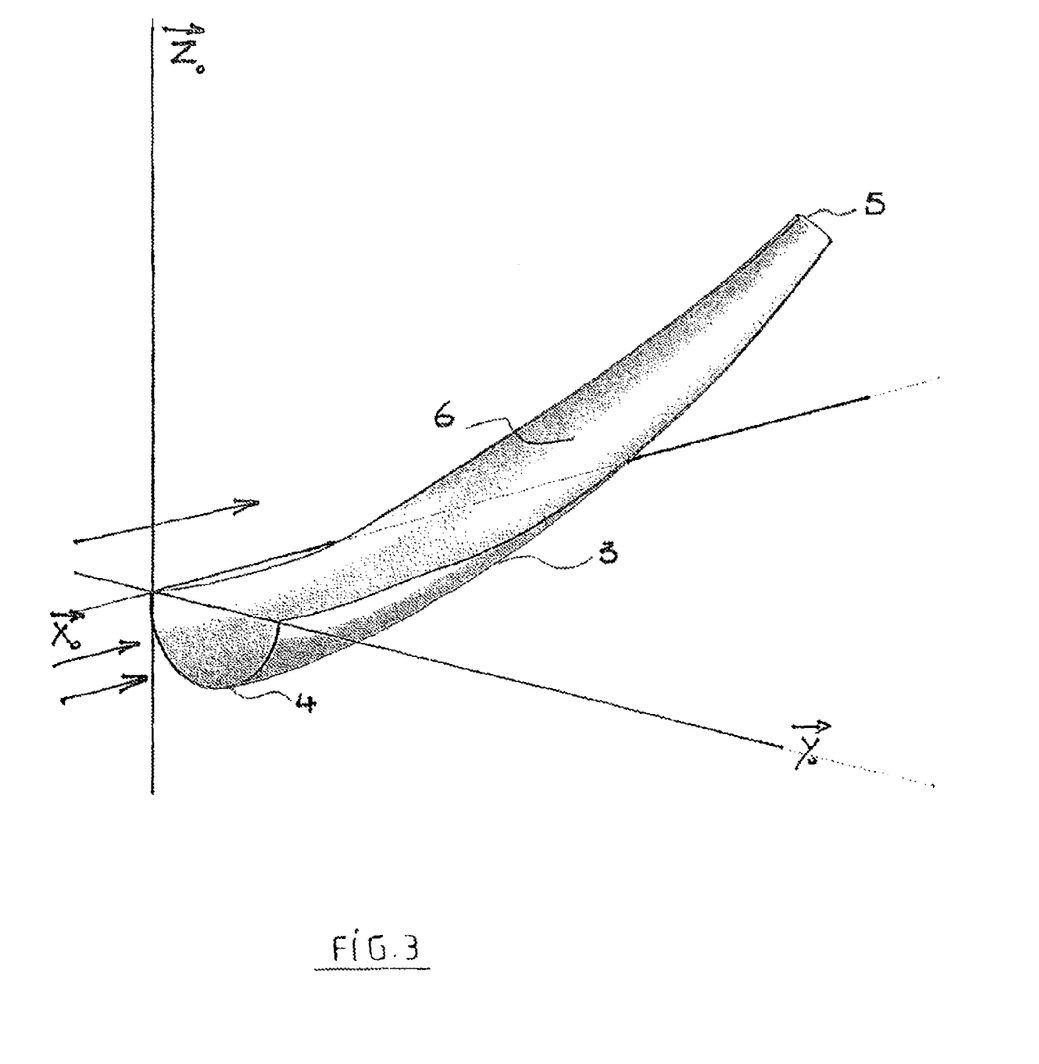
FIG. 3 is a three-dimensional view of the blade of FIG. 1 in the orthogonal frame of reference $\vec{X}_0$, $\vec{Y}_0$, $\vec{Z}_0$.

Such a rotor comprises a shaft 1 shown in FIGS. 1 and 2, as well as at least one blade 2. As shown in FIGS. 5 and 6, the rotor is equipped with three blades arranged around the shaft and separated from one another by an angle of 120°. The number of blades can be decreased or increased.

Blade 2 comprises means of fixation that are not shown for connecting drive surface 3 to rotor shaft 1. The connection means are well known to the skilled practitioner, as illustrated in document FR 2172867.

When the blades are mounted on the shaft, the leading edge, together with shaft $\vec{X}_0$, defines an angle a, known as the angle of incidence, in the $\vec{Z}_0$, $\vec{X}_0$ plane. We wish to point out that the $\vec{X}_0$ axis, around which blade 2 is intended to rotate, is appreciably parallel to the direction of the wind.

Angle of incidence a is comprised between −20° and 40° and, more advantageously, between −15 and 30°. Even more advantageously, angle of incidence a is comprised between −15° and 10°.

The rotor is arranged so as to limit, to the greatest extent possible, the distance between shaft 1 and drive surface 3 in order to reduce mechanical load on the parts constituting the rotor. Thus, as shown in FIGS. 5 and 6, drive surface 3 is juxtaposed to shaft 1.

The trace of plane P in the XY plane is a straight line that is parallel to the X axis but which can also form an angle β, known as the angle of inclination, with that axis.

Angle of inclination β is comprised between 0° and 30°, and more advantageously between 0° and 20°. Even more advantageously, angle of incidence β is comprised between 0° and 12°.

Preferably, the connection means are arranged so that angle of incidence a and/or angle of inclination β are a function of wind speed. Thus, we can adjust the angle of incidence a in such a way that the speed of rotation of the rotor remains appreciably constant regardless of wind speed.

In the variant embodiment shown in FIGS. 7 and 8, the rotor comprises four blades. The neutral axis of each of these blades is comprised in plane P and their two respective edges defined by opening 6 are also comprised in this plane. This last characteristic can be clearly seen in two of the blades of FIG. 7. This blade incorporates the characteristics of the blades described previously with reference to FIGS. 1 to 6. However, it does not necessarily twist around the neutral axis. The neutral axis is curved. This curvature tends to bring trailing edge 5 and axis of rotation $\vec{X}_0$ closer together.

The invention also relates to an energy-generating device having a nacelle on which the rotor is mounted, rotating freely around the $\vec{X}_0$ axis, as well as an energy generator coupled to the rotor.

Advantageously, the device comprises rotational means for orienting rotor shaft 1 appreciably parallel to the wind direction.

The nacelle can also be mounted rotationally on a mast extending appreciably vertically when the direction of the fluid is horizontal. Moreover, the device can also be arranged so that the drag orients the system to face the fluid without requiring additional means of rotation.

The blades that are the objects of the present invention have been used to produce energy-generating devices whose yields are substantially greater than those of known energy-generating devices.

The blade according to the invention can also be defined by one of the processes that can be used to produce it. Such a process includes making use of a blade comprising a drive surface within which a fluid is intended to flow in order to rotate the blade around an axis of rotation, $\vec{X}_0$, the blade being delimited by a leading edge and a trailing edge, and the drive surface narrowing between the leading edge and trailing edge. Additionally, this process comprises a step in which the blade is arranged so that the drive surface extends along a neutral axis contained in a plane, P. Moreover, the drive surface is arranged so that plane P is inclined at an angle d with respect to orthogonal plane $\vec{X}_0$, $\vec{Y}_0$, plane $\vec{X}_0$, $\vec{Y}_0$ being such that at the leading edge, the neutral axis intersects this plane.

An additional step can also be included whereby the neutral axis curves in plane P.

This curve can be such that the trailing axis tends to diverge from the $\vec{X}_0$ axis, as shown in FIGS. 1 to 6. In an alternative embodiment, this curve is such that the trailing axis tends to converge with the axis of rotation $\vec{X}_0$. This embodiment significantly improves the yield of the wind turbine.

The drive surface can also be allowed to twist around the neutral axis.

According to another embodiment, the drive surface has a first curve whose direction of curvature, designated first direction of curvature, is appreciably perpendicular to axis of rotation $\vec{X}_0$, and a second curve, designated second direction of curvature, whose direction of curvature is appreciably inclined with respect to the first direction of curvature. Suitably, the second direction of curvature is appreciably perpendicular to the first direction of curvature. More specifically, it is appreciably perpendicular to the $\vec{Z}_0$, $\vec{X}_0$ plane.

Advantageously, the blade comprises a first portion extending from the leading edge to the trailing edge, whose curvature is appreciably zero along the first direction of curvature. It comprises a second portion that extends from the first portion to the trailing edge and whose curvature follows the first direction of curvature. This first curve is such that the trailing edge and axis of rotation $\vec{X}_0$ tend to converge.

This double curvature helps improve energy transfer between the fluid and the blade. It increases the output of the latter.

The direction of curvature is the direction of the axis, or axes parallel to one another, around which the blade is deformed so as to obtain a desired curvature. The same blade portion can have several directions of curvature.

The blade can have a constant curvature (same axis, same radius) along the same direction of curvature or a curvature whose radius varies and/or has several axes of curvature parallel to this same direction of curvature. Suitably, each of the first and second curvatures is constant along the curved blade portion.

The blade according to the previous embodiment can also be defined by one of the processes for obtaining it. Such a process comprises the use of a blade comprising a drive surface within which a fluid is intended to flow in order to drive the blade rotationally around axis of rotation $\vec{X}_0$, the blade being delimited by a leading edge and a trailing edge, and the drive surface narrowing between the leading edge and trailing edge. For example, the blade may have a semiconical shape.

A step is included that consists in curving the blade, at least along a portion extending from the trailing edge to the leading edge, along a first direction of curvature.

Another step is also included that consists in curving the blade, at least along this same portion, along a second direction of curvature appreciably inclined to the first direction of curvature. The second direction of curvature can be appreciably perpendicular to the first direction of curvature.

Preferably, the first direction of curvature is appreciably perpendicular to the $\vec{X}_0$, $\vec{Y}_0$ plane and the second direction of curvature is appreciably perpendicular to the $\vec{Z}_0$, $\vec{X}_0$ plane.

These two blade curvature steps can be carried out in such a way that the neutral axis remains in plane P, inclined at an angle d to orthogonal plane $\vec{X}_0$, $\vec{Y}_0$ as previously mentioned.

A step for twisting the drive surface around the neutral axis can also be provided.

The present invention is not limited to the embodiments described above but extends to all embodiments consistent with its intent.

Moreover, the profile of leading edges 4 and trailing edges 5 can be adjusted even though the neutral axis does not have, along the essential part of its length, the previously mentioned characteristics.

Additionally, this type of blade can be used with any type of fluid and, especially, with air or water.

I claim:

1. Blade for a device for generating energy from a fluid, comprising a drive surface
   within which a fluid is intended to flow in order to drive the blade rotationally around an axis of rotation $\vec{X}_0$ that defines an orthogonal frame of reference $\vec{X}_0$, $\vec{Y}_0$, $\vec{Z}_0$ with axes $\vec{Y}_0$, $\vec{Z}_0$,
   delimited by a leading edge and a trailing edge,
   narrowing between the leading edge and the trailing edge,
   extending along a neutral axis,
   characterized in that the projection of the neutral axis on the $\vec{X}_0$, $\vec{Y}_0$ plane has a first curvature arranged so that, in the $\vec{X}_0$, $\vec{Y}_0$ plane, the neutral axis moves away from or toward axis of rotation $\vec{X}_0$ from the leading edge to the trailing edge, the $\vec{X}_0$, $\vec{Y}_0$ plane being defined so as to contain the neutral axis along the leading edge.

2. Blade according to claim 1, in which the projection of the neutral axis on the $\vec{Z}_0$, $\vec{X}_0$ plane presents a second curvature.

3. Blade according to claim 1, in which the neutral axis is contained in a plane P inclined at an angle d with respect to the $\vec{X}_0$, $\vec{Y}_0$ plane.

4. Blade according to claim 3, in which angle d is comprised between 50° and 90° and preferably between 55° and 65°.

5. Blade according to claim 3, in which plane P is appreciably parallel to the $\vec{X}_0$ axis.

6. Blade according to claim 3, in which the neutral axis presents, in plane P, a principal curvature of constant radius.

7. Blade according to claim 1, in which the neutral axis comprises a point A on the leading edge, a point B included in plane $\vec{X}_0$, $\vec{Y}_0$, and a point C on the trailing edge, so that portions AB and BC of the neutral axis, respectively delimited by points A and B and by points B and C, are situated on either side of the $\vec{X}_0$, $\vec{Y}_0$ plane, the AB portion of the neutral axis defining, with respect to the $\vec{X}_0$, $\vec{Y}_0$ plane, a cavity comprised between 10% and 15%.

8. Blade according to claim 1, in which the drive surface twists around the neutral axis.

9. Blade according to claim 8, in which the drive surface has, along portion BC, a twist around the neutral axis, comprised between 40° and 80° and, preferably, on the order of 60°, and has no twist along portion AB.

10. Blade according to claim 8, in which at any point $p_i$ of the neutral axis, the section of the drive surface found within a plane $\vec{y}_i$, $\vec{z}_i$ perpendicular to plane P is symmetrical with respect to a plane $\vec{z}_i$, $\vec{x}_i$, planes $\vec{y}_i$, $\vec{z}_i$ and $\vec{z}_i$, $\vec{x}_i$ being defined by an orthogonal frame of reference $\vec{x}_i$, $\vec{y}_i$, $\vec{z}_i$ whose center is coincident with point $p_i$, whose $\vec{x}_i$ axis coincides with the tangent to the neutral axis at point $p_i$ and is oriented toward the trailing edge, and whose $\vec{y}_i$, $\vec{z}_i$ axes follow said twist.

11. Blade according to claim 10, in which the section of the drive surface appreciably has the shape of a portion of a circle.

12. Blade according to claim 11, in which, for a diameter $D_{leading}$ of the section of the drive surface taken at the leading edge, the diameter $D_{trailing}$ of the section of the drive surface taken at the trailing edge is such that $$\frac{D_{leading}}{3.5} \leq D_{trailing} \leq \frac{D_{leading}}{2.5}.$$

13. Blade according to claim 11, in which, for a diameter $D_{leading}$ of the section of the drive surface taken at the leading edge, the chord between the leading edge and the trailing edge has length L, such that: $D_{leading} \cdot 3.5 \leq L \leq D_{leading} \cdot 4.5$.

14. Blade according to claim 1, in which the drive surface comprises an opening extending appreciably parallel to the neutral axis.

15. Device for generating energy from a fluid, comprising a rotor having at least one blade according to claim 1.

* * * * *